(12) United States Patent
Ostera et al.

(10) Patent No.: US 10,072,873 B1
(45) Date of Patent: Sep. 11, 2018

(54) TANKLESS WATER HEATER CARRIER

(71) Applicant: ALL-PRO MANUFACTURING, INC., Houston, TX (US)

(72) Inventors: Cary Ostera, Houston, TX (US); Daniel M. Morales, II, Houston, TX (US)

(73) Assignee: ALLPRO MANUFACTURING, INC., Houston, TX (US)

( * ) Notice: Subject to any disclaimer, the term of this patent is extended or adjusted under 35 U.S.C. 154(b) by 529 days.

(21) Appl. No.: 14/712,693

(22) Filed: May 14, 2015

Related U.S. Application Data

(60) Provisional application No. 61/993,644, filed on May 15, 2014.

(51) Int. Cl.
| | |
|---|---|
| *F24H 9/06* | (2006.01) |
| *F24H 1/10* | (2006.01) |
| *F24H 9/20* | (2006.01) |
| *F16M 13/02* | (2006.01) |

(52) U.S. Cl.
CPC ............... *F24H 9/06* (2013.01); *F16M 13/02* (2013.01); *F24H 1/103* (2013.01); *F24H 9/2028* (2013.01)

(58) Field of Classification Search
CPC .......... F24H 9/06; F24H 9/2028; F24H 1/103; F16M 13/02
USPC .................................................. 392/441–496
See application file for complete search history.

(56) References Cited

U.S. PATENT DOCUMENTS

| 4,567,350 A | * | 1/1986 | Todd, Jr. | ................ F24H 1/102 219/213 |
|---|---|---|---|---|
| 5,408,578 A | * | 4/1995 | Bolivar | ................... F24H 1/102 219/481 |
| 6,389,226 B1 | * | 5/2002 | Neale | ...................... F24H 1/102 392/485 |
| 6,598,364 B1 | * | 7/2003 | Pelles | ................... E01C 11/126 404/47 |
| 7,046,922 B1 | * | 5/2006 | Sturm | ................... F24H 9/2028 392/465 |
| 7,460,769 B2 | * | 12/2008 | Ryks | ........................ F24H 1/08 392/441 |
| D636,857 S | * | 4/2011 | Jacques | ........................ D23/320 |
| 2006/0158037 A1 | * | 7/2006 | Danley | ...................... H02J 3/32 307/64 |
| 2006/0222349 A1 | * | 10/2006 | Sturm | ................... F24H 9/2028 392/463 |

(Continued)

*Primary Examiner* — Dana Ross
*Assistant Examiner* — Joe E Mills, Jr.
(74) *Attorney, Agent, or Firm* — Rao DeBoer Osterrieder, PLLC; Dileep P. Rao

(57) ABSTRACT

A tankless water heater carrier having a pair of load supporting brackets, a slot formed through each load supporting bracket, and a pair of rigidity rails extending longitudinally along each side of each load supporting brackets. The tankless water heater carrier has a pair of side brackets connected between the pair of load supporting brackets, a pair of sliding brackets moveably mounted onto each load supporting bracket, and a plurality of removable threaded rough in guides positioned in the alignment holes of each sliding bracket and through the slots of the load supporting brackets. The tankless water heater carrier includes fasteners usable to connect the side brackets to the load supporting brackets and to connect the sliding brackets to the load supporting brackets creating a theft resistant tankless water heater that is versatile for all sizes.

13 Claims, 5 Drawing Sheets

(56) References Cited

U.S. PATENT DOCUMENTS

| | | | |
|---|---|---|---|
| 2007/0057133 A1* | 3/2007 | Cottingham | F16M 13/02 248/309.1 |
| 2008/0107410 A1* | 5/2008 | White | G01F 1/24 392/466 |
| 2008/0152331 A1* | 6/2008 | Ryks | F24H 1/08 392/490 |
| 2010/0084539 A1* | 4/2010 | Popkin | A47G 1/20 248/475.1 |
| 2014/0326844 A1* | 11/2014 | Sullivan | F16B 45/02 248/339 |
| 2014/0339392 A1* | 11/2014 | Enokijima | F16H 55/22 248/429 |
| 2016/0290553 A1* | 10/2016 | Helmikkala | F16M 11/045 |

* cited by examiner

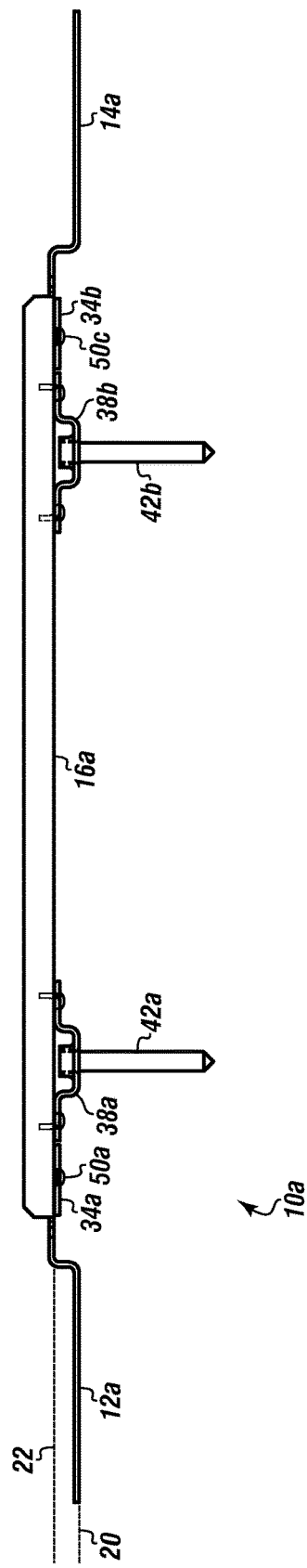

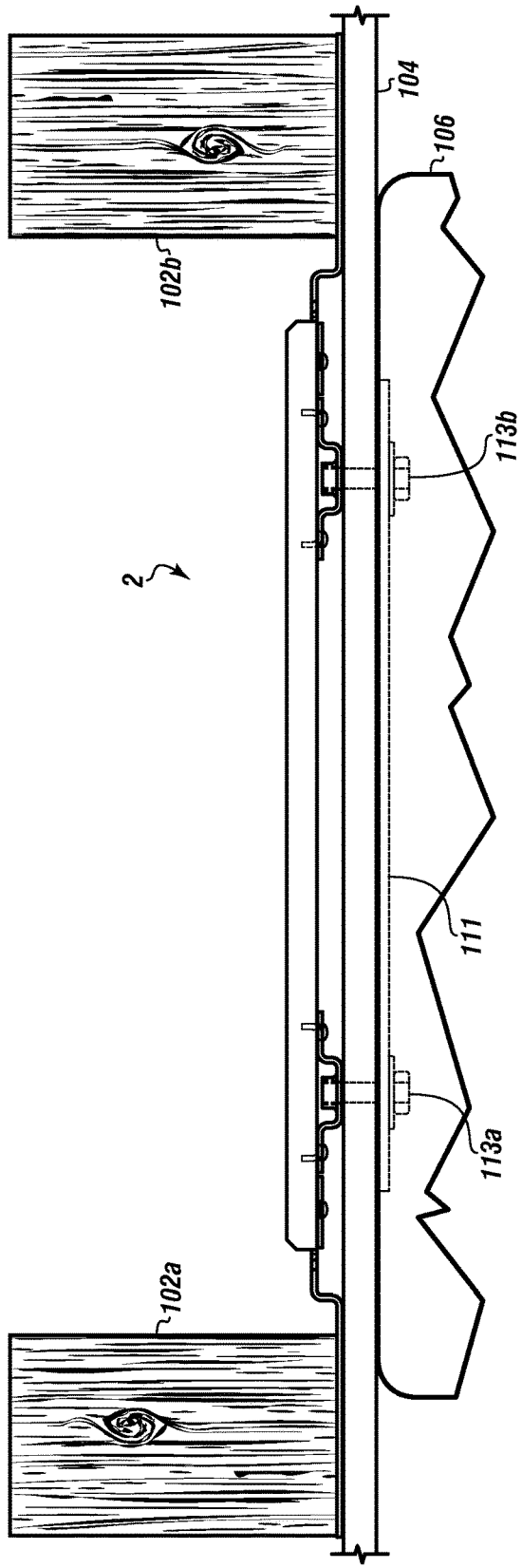

TANKLESS WATER HEATER CARRIER

CROSS REFERENCE TO RELATED APPLICATION

The current application claims priority to and the benefit of U.S. Provisional Patent Application Ser. No. 61/993,644 filed on May 15, 2014, entitled "TANKLESS WATER HEATER CARRIER". This reference is hereby incorporated in its entirety.

FIELD

The embodiments generally relate to a tankless water heater carrier that is theft resistant, for supporting tankless water heaters through a drywall which is easy to install, load supporting, and versatile for many different sizes of tankless water heaters.

BACKGROUND

A need exists for an easy to install, theft reducing, tankless water heater carrier.

A further need exists for a secure carrier that prevents a tankless water heater from falling and will maintain attachment simultaneously to both a tankless water heater and drywall for a long period of time, and should keep the tankless water heater mounted to the wall in the event of an earthquake rated at least a 1.1 on the Richter scale.

A need exists for a standardization of installation of tankless water heaters so that little training is needed for field installers.

A need exists for a tankless water heater carrier that prevents a tankless water heater from falling when drywall erodes due to a water leak or water damage, which can be a result of a hurricane or flood.

A need exists for a tankless water heater carrier that has a small carbon footprint and uses less material in construction to support an identical load as compared to currently available commercial water heater brackets or carriers.

The present embodiments meet these needs.

BRIEF DESCRIPTION OF THE DRAWINGS

The detailed description will be better understood in conjunction with the accompanying drawings as follows:

FIG. 2A depicts a side view of a lower mounting bracket according to one or more embodiments.

FIG. 2B depicts the tankless water heater carrier as it can be mounted behind drywall according to one or more embodiments.

Figure 1A:
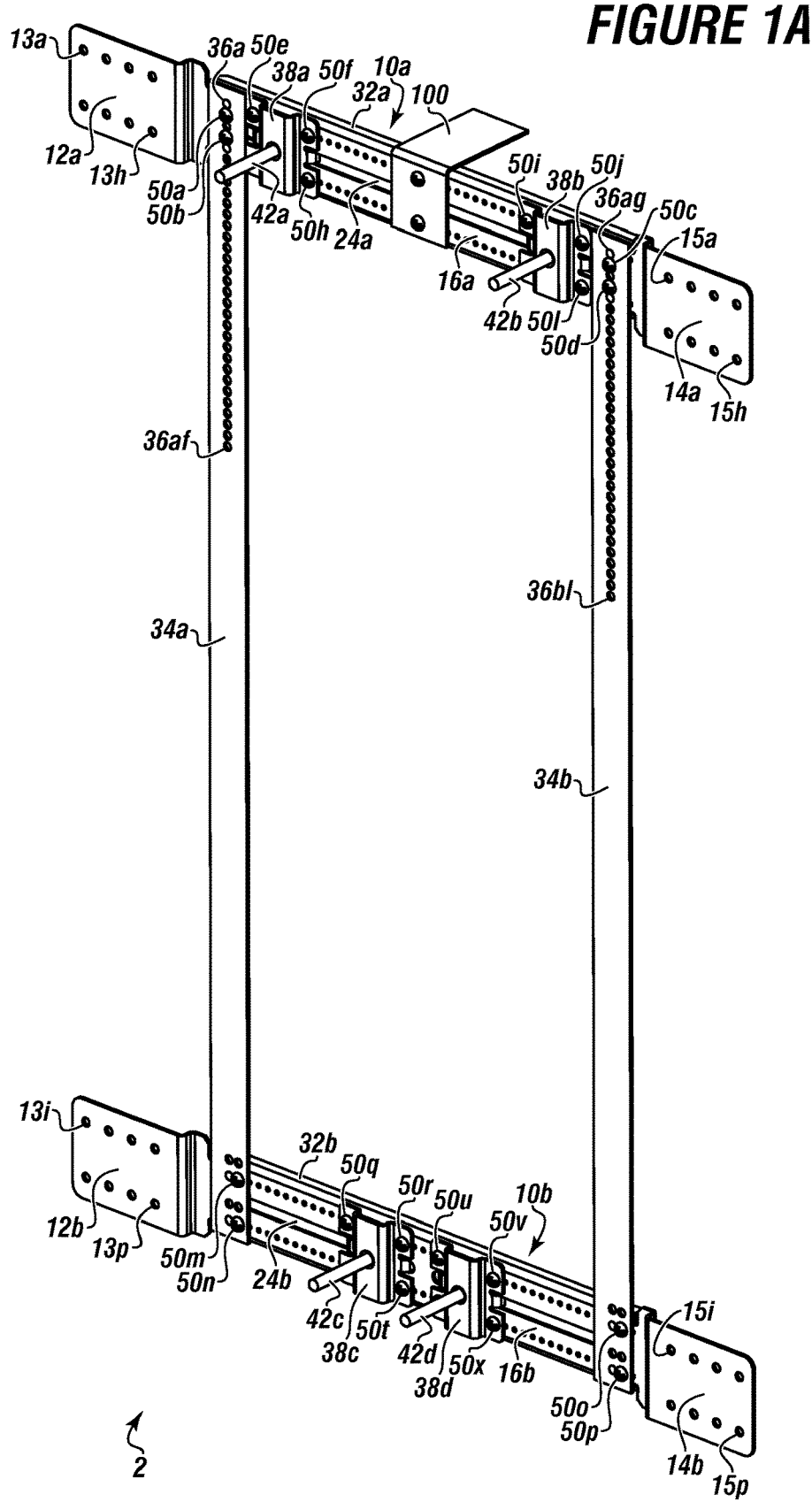
FIG. 1A depicts a perspective view of a tankless water heater carrier according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

A benefit of the invention is that the tankless water heater carrier significantly reduces the possibility of the theft of installed tankless water heaters.

Another benefit of the invention relates to the ease of installation of a water heater as compared to existing methods used by plumbers. The tankless water heater carrier allows for easy, worry-free installation without the need to create custom wood brackets as is the current custom in the field.

A benefit of the invention is that the tankless water heater carrier can use security screws that prevent the theft of these tankless water heaters without destroying the devices, reducing the possibility of additional builder costs as most of these water heaters are stolen in early stages of building construction.

Yet another benefit of the invention is that it provides a consistent, standard method of installation that increases the stabilization of the water heater and further reduces the risk of the installing plumber from installing the water heater in a manner that may prove to be unsafe, preventing possible device failure, which in some events could lead to fires.

Another benefit of the invention is that the tankless water heater carrier can be made of non-combustible materials that are also termite resistant. Further, current methods of installing tankless water heaters can involve routing hot vent-pipes through combustible materials that could lead to catastrophic fires causing property damage, injuries and death.

A benefit of the invention is that it increases the ease of installation so that the average consumer can install the device, eliminating the need to hire a specialist.

Another benefit of the invention relates to the environmental impact that the tankless water heater carrier provides through the ease of use in installation. As traditional methods of installation are often costly and complicated, this invention allows a broader reach for the market of tankless water heaters, allowing more consumers to utilize their energy savings.

The present embodiments relate to a support device that avoids stress fractures in the steel as it supports a tankless water heater away from studs and drywall.

To install the tankless water heater carrier, an installer can use an instruction sheet that allows the installer to attach the side brackets onto the load supporting brackets.

Further, based upon the instruction sheet, they can adjust the sliding brackets onto the load supporting brackets using the plurality of fasteners.

Next, the installer can screw in a quantity of four rough-in guides into the holes on the slide brackets.

Next, the installer can lift the assembled assembly into a desired position on the wall, make sure the assembly is level, and then secure the assembly to wood or metal studs through holes on the load supporting brackets with fastening means, such as nails or screws.

The tankless water heater carrier can then sit there until the "drywall phase" of building construction.

Once the drywall has been installed, the installer can take the drywall and push it up against the assembly and the points on the rough-in guides make an impression on the non-exposed side of the drywall. The installer can then drill holes where the impressions were made in the drywall. The installer can then install the drywall as normally installed.

Once the drywall is installed, the installer can then install the tankless water heater, using the manufacturer supplied mounting bracket, installing the mounting bracket on the heater itself using theft-reducing screws.

Next, the installer can remove the rough-in guides and replace them with theft-reducing screws.

In an embodiment, a vent chair can be attached to the top load supporting bracket.

Figure 1B:
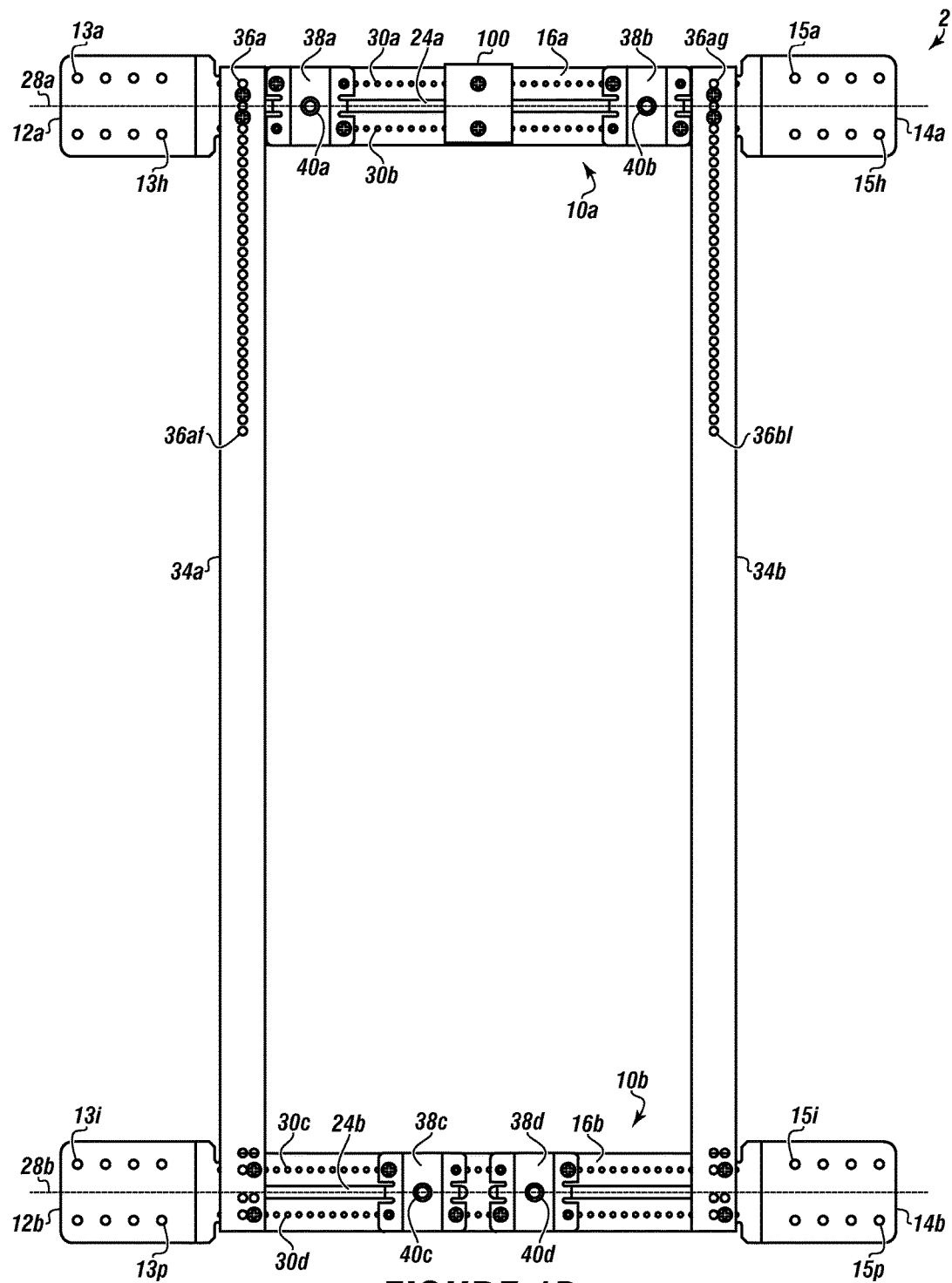
FIG. 1B depicts a front view of the tankless water heater carrier according to one or more embodiments.

Turning now to the Figures, FIG. 1A depicts a perspective view of the tankless water heater carrier. FIG. 1B depicts a front view of the tankless water heater carrier.

Referring to FIGS. 1A and 1B, the tankless water heater carrier 2 can include a pair of load supporting brackets 10a and 10b.

Each load supporting bracket 10a and 10b can have a first plate 12a and 12b respectively. Each first plate can have a plurality of first plate connecting holes 13a-13p. Each load supporting bracket 10a and 10b can have a second plate 14a and 14b respectively. Each second plate can have a plurality of second plate connecting holes 15a-15p. The first plates and second plates can be configured in a first plane.

Each load supporting bracket 10a and 10b can have a middle portion 16a and 16b respectively. Each middle portion can connect between the first plates and second plates in a second plane different from the first plane.

The middle portions 16a and 16b can each have a bracket side with a slot 24a and 24b formed through each middle portion along each longitudinal axis of the middle portion. Each middle portion 16a and 16b can have a longitudinal axis 28a and 28b respectively.

A plurality of pairs of connecting holes can be formed in each middle portion on opposite sides of each slot between each first and second side. The middle portions can each have from 4 connecting holes to 24 connecting holes. Connecting holes 30a and 30b are shown as a pair of connecting holes on opposite sides of slot 24a. Connecting holes 30c and 30d are shown as a pair of connecting holes on opposite sides of slot 24b.

A pair of rigidity rails can extend longitudinally along each side of each middle portion. For middle portion 16a a rigidity rail pair 32a is shown. For middle portion 16b a rigidity rail pair 32b is shown. Each rigidity rail extends away from the bracket side of the middle portion. The rigidity rails can be mounted in parallel with each other and can be solid, extending 1/16 inch to 0.5 inch away from middle portion.

The tankless water heater carrier 2 can include a pair of side brackets 34a and 34b. Each side bracket can connect between the load supporting brackets 10a and 10b. Each side bracket can have a plurality of side connecting holes 36a-36b1. In embodiments, 32 connecting holes can be formed in each side.

A pair of sliding brackets 38a and 38b can be slid moveably onto load supporting bracket 10a. A pair of sliding brackets 38c and 38d can be slid moveably onto load supporting bracket 10b.

Each pair of sliding brackets can moveably slide onto each middle portion of each load supporting bracket. Each sliding bracket can have an alignment hole. Sliding brackets 38a-38d are shown with alignment holes 40a-40d respectively.

A removable threaded rough in guide can be positioned in each alignment hole of the sliding bracket. The removable threaded rough in guide can penetrate through the slot of the middle portion of the load supporting bracket to provide a 90 degree angle.

Removable threaded rough in guides 42a-42d are shown positioned in alignment holes 40a-40d of the sliding brackets 38a-38d respectively.

A plurality of fasteners can be used to connect the side brackets to the load supporting brackets and to connect the sliding brackets to the middle portions of the load supporting brackets.

Fasteners 50a and 50b can connect side bracket 34a to load supporting bracket 10a. Fasteners 50c and 50d can connect side bracket 34b to load supporting brackets 10a.

Four fasteners 50e-50h can connect sliding bracket 38a to the middle portion 16a of the load supporting bracket 10a. Four fasteners 50i-50l can connect sliding bracket 38b to the middle portion 16a of the load supporting bracket 10a.

Fasteners 50m and 50n can connect side bracket 34a to load supporting bracket 10a. Fasteners 50o and 50p can connect side bracket 34b to load supporting bracket 10b.

Four fasteners 50q-50t can connect sliding bracket 38c to the middle portion 16b of the load supporting bracket 10b. Four fasteners 50u-50x can connect sliding bracket 38d to the middle portion 16b of the load supporting bracket 10b.

The tankless water heater carrier can have an adjustable vent bracket 100. The adjustable vent bracket 100 can have a first portion engageable with the load supporting bracket 10a and a second portion configured to support a vent pipe usable with the tankless water heater.

FIG. 2A depicts a side view of a load supporting bracket 10a for the tankless water heater carrier.

The load supporting bracket 10a can have a first plate 12a and a second plate 14a. The first plate 12a and second plate 14a can be configured in a first plane 20.

A middle portion 16a can be connected between the first and second plates in a second plane 22 different from the first plane.

A pair of side brackets 34a and 34b are shown attached to the load supporting bracket 10a with fasteners 50a and 50c.

A pair of sliding brackets 38a and 38b can be moveably positioned onto the middle portion 16a of the load supporting bracket 10a and fastened with fasteners.

A pair of removable threaded rough in guides 42a and 42b can be positioned in an alignment hole of each sliding bracket. Each removable threaded rough in guide is depicted extending through the slot of the middle portion of the load supporting bracket at a 90 degree angle to the middle portion of the load supporting bracket.

FIG. 2B depicts a view of the tankless water heater carrier 2 as mounted behind drywall 104.

The tankless water heater carrier 2 can be mounted between studs 102a and 102b behind the installed drywall 104. The studs can be wood, steel or another approved material, such as polymer concrete or aerated concrete.

A tankless water heater 106 can be mounted on the exterior of the drywall 104, through the drywall 104 and onto the tankless water heater carrier 2. The tankless water heater carrier 2 can be mounted on an opposite side of the drywall from the tankless water heater 106.

A factory supplied bracket 111 can support the tankless water heater between the drywall and the tankless water heater on the same side of the drywall as the tankless water heater. The factory supplied bracket 111 can be mounted to security and theft resistant screws. Each security and theft resistant screw 113a and 113b can engage one of the sliding brackets.

Figure 3B:
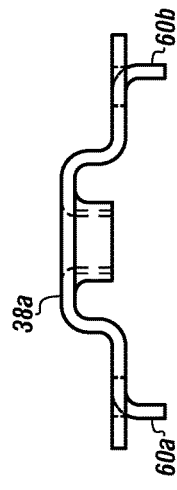
FIG. 3B depicts a side view of the sliding bracket according to one or more embodiments.
Figure 3C:
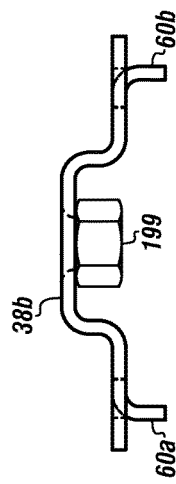
FIG. 3C depicts a side view of the sliding bracket according to one or more embodiments.
Figure 3A:
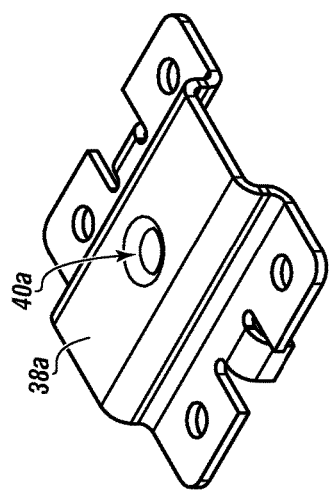
FIG. 3A depicts a perspective view of a sliding bracket portion according to one or more embodiments.

FIG. 3A depicts a perspective view of a sliding bracket 38a with an alignment hole 40a.

FIG. 3B depicts a side view of a sliding bracket 38a with a pair of mounting tabs 60a and 60b. The mounting tabs ensure the sliding bracket stays in proper alignment with the slot of the middle portion.

FIG. 3C depicts a side view of an embodiment of a sliding bracket 38a with a pair of mounting tabs 60a and 60b with a tack welded nut 199. The tack welded nut can be secured to the sliding bracket to extend the threaded engagement of the rough in guides.

In embodiments, the tankless water heater carrier can have a separation of from 0.25 inches to 3 inches from the drywall. In embodiments, the load supporting brackets can have a length from 6 inches to 24 inches. In embodiments, the load supporting brackets can be made from cold rolled steel, galvanized steel, carbon fiber, an engineered polymer, or a lightweight durable metal capable of supporting a load of at least 40 pounds. In embodiments, the slots can have a width of 0.25 inches to 0.5 inches.

In embodiments, the side brackets can each have a width from 0.5 inches to 3 inches and a thickness from $\frac{1}{16}^{th}$ inch to 0.3 inches. In embodiments, the side brackets can be made from cold rolled steel, galvanized steel, carbon fiber, an engineered polymer, or a lightweight durable metal capable of supporting a load of at least 40 pounds.

In embodiments, the tankless water heater carrier can use a plurality of temporary rough in guides each having a point. In embodiments, the tankless water heater carrier can use removable rough in guides with variable diameters, so long as each diameter fits within the alignment hole and has a length adequate to create an impression on drywall, such as a length from 1 inch to 2 inches.

In embodiments, the tankless water heater carrier can have an offset mounting portion between the mounting tabs. The offset mounting portion can extend at least 0.25 inches from the middle section.

In embodiments, the tankless water heater carrier can have a plurality of heater codes stamped adjacent a connecting hole enabling fast installation of any one of different sizes of tankless heaters without the need to train an installer which hole to use to hang the tankless water heater.

In embodiments, the fasteners can be any fastening means known in the art, such as screws, nuts, bolts, or combinations thereof. In embodiments, at least a portion of the connecting holes can be threaded connecting holes, such as ⅛, ⅓, or ½ of the connecting holes can be threaded.

In embodiments, the tankless water heater carrier can have an attached in-line tankless water heater for interconnection between an electrical power supply, a cold water inlet line and a hot water supply line.

The tankless water heater can have body; a thermostat mounted on the body; a cold water inlet and a hot water outlet; an elongated passage formed internally of the body in fluid communication between the cold water inlet and a water sensing/heat element activating means. The tankless water heater can use a heating element connected to the elongated passageway; and use a means for actuating a micro-switch in the water sensing/heat activating means to activate the heating element to substantially instantaneously heat water in the body. In other embodiments, the heating element can be natural gas and use a heat exchanger.

While these embodiments have been described with emphasis on the embodiments, it should be understood that within the scope of the appended claims, the embodiments might be practiced other than as specifically described herein.

What is claimed is:

1. A tankless water heater carrier configured for mounting behind drywall comprising:
    a) a pair of load supporting brackets, each load supporting bracket having:
        (i) a first plate with a plurality of first plate connecting holes;
        (ii) a second plate with a plurality of second plate connecting holes, wherein the first plate and the second plate are configured in a first plane;
        (iii) a middle portion connected between the first plate and the second plate in a second plane different from the first plane, the middle portion having a bracket side comprising:
            1. a slot formed along a longitudinal axis between a first side and a second side; and
            2. a plurality of pairs of connecting holes formed in the middle portion on opposite sides of each slot between each side; a pair of rigidity rails extending longitudinally along each side of the middle portion, each rigidity rail extending away from the bracket side, the pair of rigidity rails mounted in parallel with each other;
    b) a pair of side brackets, each side bracket comprising a plurality of side connecting holes, each side bracket connected between the pair of load supporting brackets;
    c) a pair of sliding brackets, each pair of sliding brackets moveably mounted onto the middle portion of each load supporting bracket, each sliding bracket having an alignment hole;
    d) a plurality of removable threaded rough in guides, each removable threaded rough in guide positioned in the alignment hole of each sliding bracket and through the slot of the middle portion of each load supporting bracket to provide a 90 degree angle; and
    e) a plurality of fasteners usable to connect the pair of side brackets to the pair of load supporting brackets and to connect each sliding bracket to the middle portion of each load supporting bracket.

2. The tankless water heater carrier of claim 1, comprising an adjustable vent bracket comprising a first portion engageable with each load supporting bracket and a second portion configured to support a vent pipe usable with a tankless water heater.

3. The tankless water heater carrier of claim 1, comprising a separation from 0.25 inches to 3 inches between the first plane and the second plane.

4. The tankless water heater carrier of claim 1, wherein each load supporting bracket comprises a length from 6 inches to 24 inches.

5. The tankless water heater carrier of claim 1, wherein each load supporting bracket comprises cold rolled steel, galvanized steel, or lightweight durable metal capable of supporting a load of at least 40 pounds.

6. The tankless water heater carrier of claim 1, wherein each side bracket has a width from 0.5 inches to 3 inches and a thickness from $\frac{1}{16}$ of an inch to 0.3 inches, and wherein each side bracket comprises cold rolled steel, galvanized steel, or lightweight durable metal capable of supporting a load of at least 40 pounds.

7. The tankless water heater carrier of claim 1, wherein each guide of the plurality of removable threaded rough in guides tapers to a point.

8. The tankless water heater carrier of claim 1, wherein each guide of the plurality of removable threaded rough in guides has a diameter equal to or less than a diameter of the alignment hole in which it is placed, and a length adequate to create an impression on drywall.

9. The tankless water heater carrier of claim 1, wherein the sliding brackets comprise a first mounting tab, a second mounting tab, and an offset mounting portion between the first mounting tab and the second mounting tab, the offset mounting portion extending at least 0.25 inches from the middle section.

10. The tankless water heater carrier of claim 1, wherein the tankless water heater carrier comprises a plurality of heater codes stamped adjacent a connecting hole enabling fast installation of any one of different sizes of tankless heater without the need to train an installer.

11. The tankless water heater carrier of claim 1, wherein the plurality of fasteners are screws, nuts, bolts, or combinations thereof.

12. The tankless water heater carrier of claim 1, wherein at least a portion of the connecting holes are threaded.

13. The tankless water heater carrier of claim 1, wherein the slot has a width from 0.25 inches to 0.5 inches.

\* \* \* \* \*